March 2, 1954
C. SIEBRING
2,670,862
SNOW SCOOP
Filed Feb. 7, 1952
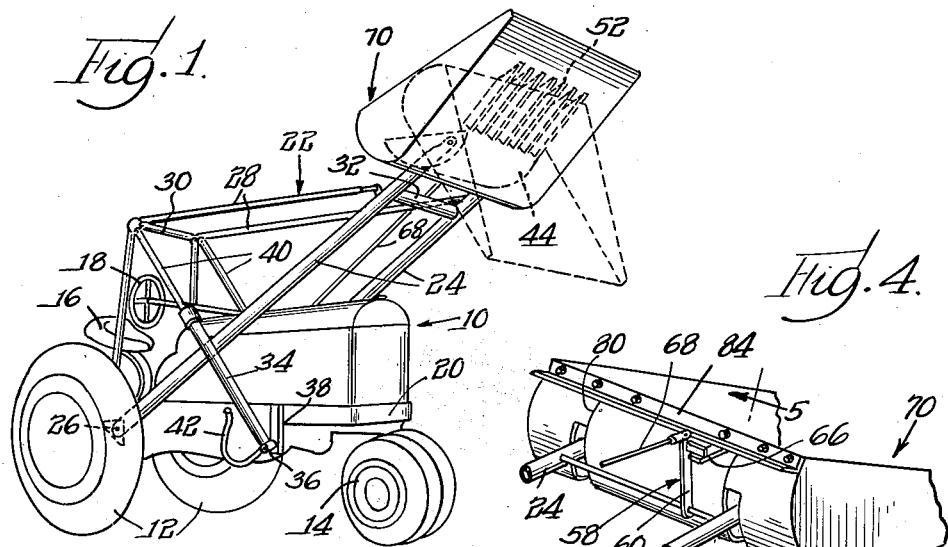
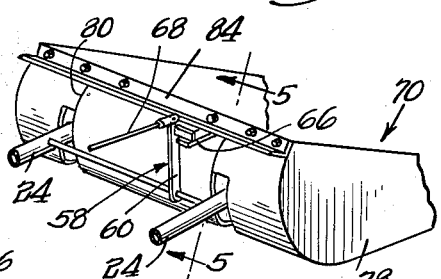
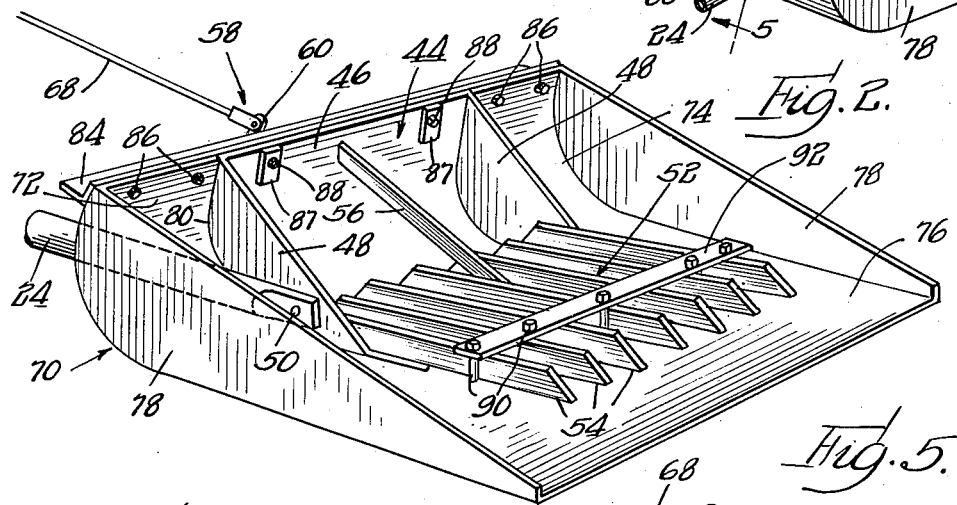
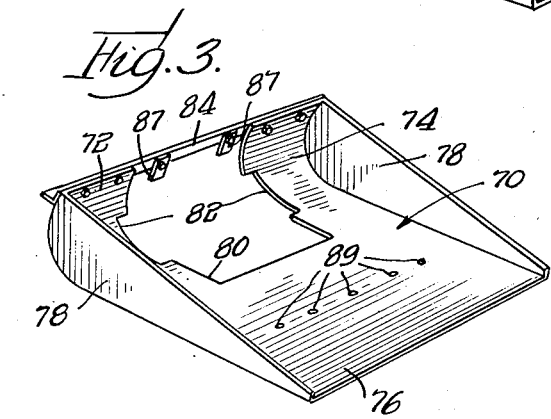
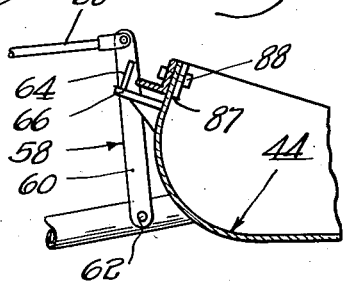
INVENTOR.
Claude Siebring
BY
Moore, Olson & Trexler
attys Patented Mar. 2, 1954

2,670,862

UNITED STATES PATENT OFFICE 2,670,862

SNOW SCOOP

Claude Siebring, George, Iowa

Application February 7, 1952, Serial No. 270,330

5 Claims. (Cl. 214—145)

This invention is concerned generally with snow loading apparatus or the like, and particularly with a scoop or shovel adapted to be attached to a manure loader for handling snow and the like.

Snow has become a serious problem to farmers since the mechanization of farms due to heavy snow and drifts closing roads, driveways, paths and the like, to make them impassable by vehicles, although they could be traversed by animals. Manual removal of snow is slow and tedious. The purchase of commercial snow handling apparatus would be commercially impractical in most cases, due to the large part of the year in which the apparatus might be out of service.

Many farmers have manure loaders or other lifting apparatus having forks as the lifting implements. These forks are not suitable for lifting snow and other loose material. This invention solves the problem of snow removal for farmers by the provision of a scoop adapted for cooperative attachment to a manure loader without removal of any parts of the manure loader.

An object of this invention is to provide a scoop for lifting snow and the like and attachable to a manure loader.

Another object of this invention is to provide a scoop quickly and easily clamping onto the lifting fork of a manure loader.

A further object of this invention is to provide a scoop having an open portion completed by the bucket of a manure loader fork.

Yet another object of this invention is to provide a scoop and manure loader fork and bucket combining to form a mechanism for lifting snow and other loose material.

Other and further objects and advantages of the present invention will be apparent from the following description when taken in conjunction with the accompanying drawings wherein:

Fig. 1 is a perspective view of a tractor and manure loader with my scoop attached to the manure loader;

Fig. 2 is an enlarged perspective view of the scoop as attached to the manure loader fork and bucket;

Fig. 3 is a perspective view on a slightly smaller scale of the scoop alone;

Fig. 4 is a fragmentary perspective view of the scoop and bucket from the rear thereof showing the latching mechanism for dumping; and Fig. 5 is a cross-sectional view substantially along the line 5—5 of Fig. 4 and showing the latching mechanism.

Referring now to the figures in greater detail, there is shown a tractor 10 of any known or conventional construction having rear drive wheels 12, front or steering wheels 14, an operator's seat 16 and a hand steering wheel 18. The frame 20 of the tractor supports hydraulic lifting mechanism 22 including a pair of booms 24. The booms 24 are located on opposite sides of the tractor and each is pivotally attached to the frame 20 and 26. A triangular lifting frame 28 is attached to each of the booms near the ends thereof and a cross brace 30 extends between the apices of the triangular frames. A spacer 32 also is secured between the booms near the forward end thereof.

A hydraulic cylinder 34 is pivotally mounted at 36 on a bracket 38 on each side of the tractor frame. The piston rods 40 extend from the hydraulic cylinders 34 to the apices of the triangular lifting frames 28. Hydraulic fluid is supplied to the cylinders 34 through flexible lines 42. The controls for the hydraulic mechanism are not pertinent, but will be understood to be of conventional construction and within easy reach of the operator or driver of the tractor.

A manure bucket 44 is pivotally mounted at the free ends of the booms 24. The manure bucket is of scoop-like configuration having a curved rear and bottom wall 46. The bucket further includes sidewalls 48 pivotally attached to the booms at 50. A manure fork 52 comprising a plurality of tines 54 having pointed tips extends forwardly of the bucket 44. A brace 56 extends across the bucket 44 substantially from the upper edge to the lower front edge thereof and midway between the sidewalls 48 to brace the forward edge of the bucket so that it will not be bent by the load on the forwardly extending tines 54. It will be understood that the brace 56 and tines 54 are secured to the bucket 44 in any suitable manner such as by welding.

The manure loader consisting of a bucket 44 and fork 52 is held in a substantially horizontal position for lifting as shown in the full line position of Fig. 1 and is provided with suitable latch mechanism 58 (Figs. 2, 4 and 5) for releasing the bucket and fork to drop to the position shown in dotted lines in Fig. 1 for dumping the load. The latch mechanism 58 may be of any suitable construction and has been illustrated simply as a bar 60 pivotally secured on a shaft 62 extending between the booms 24 and immediately adjacent the rear of the bucket 44. The bar 60 is provided near its upper end with a transversely extending latch 64 fitting above a flange or keeper 66 extending rearwardly from the bucket 44 near the top thereof. A pull rod 68 is pivotally attached to the bar 60 near the top thereof. A load on the bucket 44 and fork 52 tends to tip this loading structure forwardly so that the flange or keeper 66 engages beneath the latch member 64 to maintain the bucket in upright position. A tug rearwardly on the actuating rod 68 pulls the latch member 64 away from the keeper 66 and the bucket and fork then are free to pivot to the dumping position shown in dotted lines in Fig. 1.

It will be apparent that the fork 52 is quite incapable of lifting snow and other loose material and that the bucket 44 in itself has too low a capacity to be of any practical use in loading snow or the like. Furthermore the tines 54 prevent the bucket 44 from closely approaching any obstruction against which snow might be drifted.

To enable the loading apparatus heretofore set forth to load snow, I have provided a scoop 70. The scoop 70 includes a rear wall 72 smoothly curving at 74 into a bottom wall or floor 76. Side plates 78 having straight upper edges are secured to the rear wall 72, curved portion 74, and floor 76 in any suitable manner such as welding, or may be formed integral therewith. The rear wall 72, curved portion 74, and floor 76 are cut away at 80 snugly to accommodate the manure loading bucket 44 with the tines 54 of the fork 52 lying on top of the floor 76, it being understood that the bucket 44 and scoop 70 are curved in exactly the same manner. The curved portion 74 further is cut away or recessed at 82 to provide clearance for the ends of the booms 24.

An angle member 84 extends across the back 72 of the scoop 70 at the upper edge thereof and is secured by any suitable means such as rivets or bolts 86 or welding. Tabs 87 are bolted to the angle member 84 by bolts 88 and extend into the cut-out 80. The floor 76 of the scoop 70 is provided with apertures 89 for accommodating bolts 90 mounting a strap or bar 92.

To secure the scoop 70 to the manure loader comprising the bucket 44 and fork 52, it is necessary only to lower the manure loader to ground level and to drive the tractor forward to position the bucket in the cut-out 80 of the scoop with the fork tines 54 overlying the floor 76 of the scoop. The tabs 86 are bolted against the front face of the rear wall of the manure bucket 44 to secure the bucket against the angle member 84. The strap 92 is clamped down against the tops of the fork tines 54 by tightening of the bolts 90 further to secure the scoop 70 to the manure loading structure. It will be understood that the bolt holes 89 are threaded or that nuts are secured to the bolts 90 below the floor 76.

With the scoop 70 in cooperative engagement with the manure bucket 44 and fork 52, combined lifting structure is capable of lifting large quantities of snow or other loose material which cannot be handled by the usual manure bucket and fork. Thus it will be seen that the farmer is enabled to load snow and other loose material with only the slight expenditure of the cost of the scoop 70 alone without the necessity of also purchasing some specific lifting apparatus.

The specific example of my invention shown and described herein is for illustrative purposes only. My invention is not to be limited to this illustrative example, but is to include all such modifications as fall within the spirit and scope of the appended claims.

I claim:

1. A scoop for loading snow and the like and attachable to a manure loader or the like having a rear bucket portion and a fork structure including a plurality of tines extending substantially forwardly of said bucket portion, said scoop comprising side walls, a rear wall and a floor having a transversely continuous floor surface extending between said side walls for a substantial distance rearwardly of the front margin of the floor, said rear wall and rear portion of said floor being apertured substantially complementary to the shape of the bucket portion of the loader for receiving the said bucket portion to substantially close the scoop aperture with the free end portions of the tines of the loader projecting forwardly of the scoop aperture in overlying contact with the adjacent part of said floor surface; and means for clamping the scoop to the loader in rigid association therewith and including securing means between said bucket portion and the rear of the scoop, and fastener means between the front margin of said floor and the rear aperture therein and cooperating with associated projecting end portions of the tines for securing the same in contact with the floor surface to reinforce the same in use.

2. A scoop as claimed in claim 1, wherein the fastener means includes bar means and fastener elements securing the bar means to adjacent tine surfaces.

3. A scoop as claimed in claim 1, wherein the fastener means includes a transverse bar engaging the tops of the tines for securing the same in contact with the floor surface.

4. A scoop as claimed in claim 1, wherein a brace member extends across the rear wall of the scoop substantially at the top thereof and across the aperture therethrough and wherein the bucket portion is secured to said brace member.

5. A scoop as claimed in claim 4, wherein a bar-like member overlies the projecting end portions of the tines and is secured to the floor surface for clamping the tines in contact therewith.

CLAUDE SIEBRING.

References Cited in the file of this patent

UNITED STATES PATENTS

| Number | Name | Date |
|---|---|---|
| 947,964 | Collins et al. | Feb. 1, 1910 |
| 2,417,560 | McNamara, Jr. | Mar. 18, 1947 |
| 2,429,717 | Gordon | Oct. 28, 1947 |
| 2,466,878 | Davis et al. | Apr. 12, 1949 |
| 2,496,563 | Siems | Feb. 7, 1950 |
| 2,577,977 | Nelson | Dec. 11, 1951 |
| 2,612,280 | Stueland | Sept. 30, 1952 |
| 2,627,989 | Chaves | Feb. 10, 1953 |